United States Patent [19]

Ohara et al.

[11] Patent Number: 4,766,452
[45] Date of Patent: Aug. 23, 1988

[54] TRANSMISSION CHANGEOVER MECHANISM FOR CAMERA

[75] Inventors: Tsunemasa Ohara, Tokyo; Masayuki Suzuki, Kanagawa; Yoichi Tosaka, Tokyo; Masaharu Kawamura, Kanagawa; Yoshihito Harada, Kanagawa; Ryuichi Kobayashi, Kanagawa, all of Japan

[73] Assignee: Canon Kabushiki Kaisha, Tokyo, Japan

[21] Appl. No.: 889,087

[22] Filed: Jul. 23, 1986

[51] Int. Cl.⁴ .................... G03B 1/12; G03B 17/00
[52] U.S. Cl. .................... 354/173.1; 354/214
[58] Field of Search ............ 354/202, 170, 171, 173.1, 354/173.11, 153, 204–206, 226, 212–214

[56] References Cited

U.S. PATENT DOCUMENTS 4,363,547 12/1982 Hashimoto et al. ......... 354/173.1 X

FOREIGN PATENT DOCUMENTS 112735 7/1982 Japan ................................. 354/214
79339 5/1985 Japan ................................. 354/212

Primary Examiner—Donald A. Griffin
Attorney, Agent, or Firm—Toren, McGeady & Associates

[57] ABSTRACT

A changeover mechanism in the transmission of rotation of a drive source such as a reversible motor to an operating mechanism for the camera comprises a planetary clutch and is provided with a planetary changeover limiting member pivotally mounted on a common shaft of a planetary gear of the planetary clutch and frictionally connected thereto, whereby when the motor rotates in such a direction that the planetary gear engages a gear which is drivingly connected to the operating mechanism, release of the planetary gear from the engagement is inhibited, and when in the reverse direction, the planetary gear is permitted to disengage from the gear of the mechanism.

3 Claims, 3 Drawing Sheets

TRANSMISSION CHANGEOVER MECHANISM FOR CAMERA

BACKGROUND OF THE INVENTION

1. Field of the Invention

This invention relates to a transmission changeover mechanism for a camera using a planetary gear.

2. Description of the Related Art

In the past, operating mechanisms in a camera, for example, the film transportion mechanism, or the charging mechanism for the shutter, have been driven by the driving power of a motor. It is known that a planetary clutch is arranged between this operating mechanism and the aforesaid motor in order to change the gear ratio or to selectively operate a plurality of operating mechanisms depending on the direction of rotation of the motor. The above-defined planetary clutch comprises a sun gear connected to is driven by the gear. Depending on the normal or reverse rotation of the sun gear, the planetary gear is brought into or taken out of engagement with a gear to be driven, as it revolves round the sun gear. This function is utilized in changing over the transmission system.

In FIG. 1 there is shown the conventional transmission changeover mechanism in the form of the planetary clutch incorporated to the operating mechanism in the camera. When the sun gear 50 rotates in the counterclockwise direction indicated by the arrow, a planetary carrier or lever 54, because it is frictionally connected to the sun gear 50, turns in the counterclockwise direction until the planetary gear 52 engages a 2-stage gear 60. A small gear of this 2-stage gear 60 always meshes with a drive gear 8 on which is formed a charge cam 9. Therefore, rotation of the planetary gear 52 is transmitted to the drive gear 8. By the clockwise rotation of the cam 9, a power storing lever 10 is turned in a counterclockwise direction to move a charge lever 20 in such a direction that power is stored on a drive spring (not shown) for the shutter or the like.

Here, the direction of power transmission from the planetary gear 52 to the 2-stage gear 60 coincides with the meshing pressure angle direction (indicated by arrow B). When the sun gear 50 is driven as the motion generating wheel, therefore, if the planetary gear 52 and the 2-stage gear 60 are once engaged with each other, the engagement is never broken during the driving opertion. However, even if the direction of rotation of the sun gear 50 is the arrow direction (counterclockwise direction), when the power transmission changes its direction to: the 2-stage gear 60→ the planetary gear 52→ the sun gear 50, in other words, when the 2-stage gear 60 is driven to rotate at a faster speed than that of rotation of the planetary gear 52, the power transfer across the tooth surfaces occurs in a direction indicated by arrow D, expelling the planetary gear 52 out of engagement.

Actually, in case the charging of the camera is performed through the above-described planetary clutch, it is customary that the mechanism to be driven, such as the mirror mechanism or shutter is arranged to be charged by the reciprocating lever 10 in such a manner that the charge lever 20 is urged to store power on the drive spring therefor, and, when the operating mechanism is actuated, for example, the shutter operation terminates, the charge lever 20 returns to the initial position. That is, when the charge cam 9 is rotated in the clockwise direction by the motor (not shown) through the planetary clutch, the power storing lever 10 turns in the counterclockwise direction to perform charging of the camera. FIG. 1 illustrates the initial stage of the aforesaid charging, and FIG. 2 illustrates a stage near (just before) the end of charge angle. In this charging operation, the active force F of the power storing lever 10 works, except for the state of FIG. 2, so as to turn the charge cam 9 in the counterclockwise direction. But, when the state of FIG. 2 is reached, the active force F of the power storing lever 10 works so as to turn the charge cam 9 in the reverse or clockwise direction by the cam displacement of the charge cam 9. For this reason, it is near the end of the charging of the camera that the load of the side to be driven (the active force F) backs up the charge cam 9 in the driving direction, whereby the direction of transmission of the drrving power is reversed. Therefore, the planetary gear 52 has a force applied so that it tends to disengage from the 2-stage gear 60. As a result, the operative connection between the charge cam 9 and the sun gear 50 is cut off, and the control to insure that the cam 9 is made to stop in a prescribed position becomes impossible, permitting it to overrun which causes the power storing lever 10 to slightly turn in the charging direction again. If, in this state, the camera is actuated, the charge lever 20 which would normally move to the position indicated by dashed lines in FIG. 2, because of the power storing lever 10 being not fully retracted, collides with the power strong lever on the way and is stopped. For this reason, a faulty operation of the camera occurs, and the possibility of damaging the operating mechanism is increased.

SUMMARY OF THE INVENTION

An object of the invention is to provide a transmission changeover mechanism for a camera which enables a faulty operation and damage due to the wrong meshing disengagement to be prevented.

DETAILED DESCRIPTION OF THE PREFERRED EMBODIMENT

Figure 1:
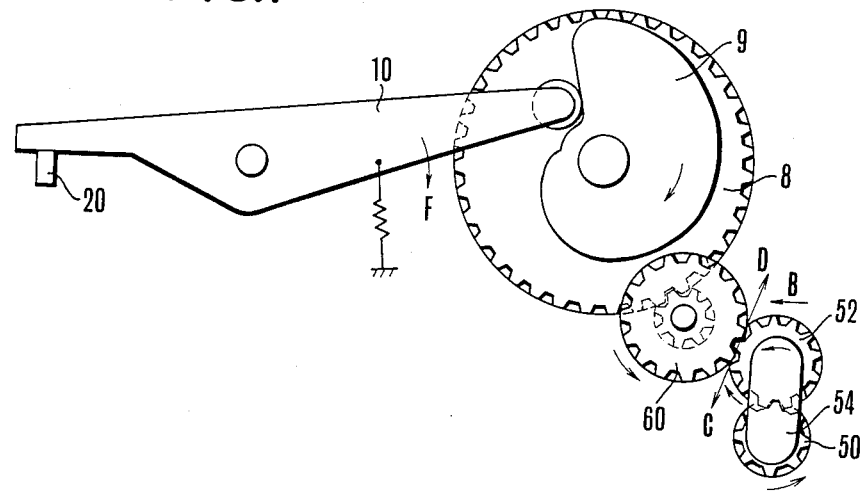
FIGS. 1 and 2 are elevational views of the conventional transmission changeover mechanism for camera in two operative positions.
Figure 2:
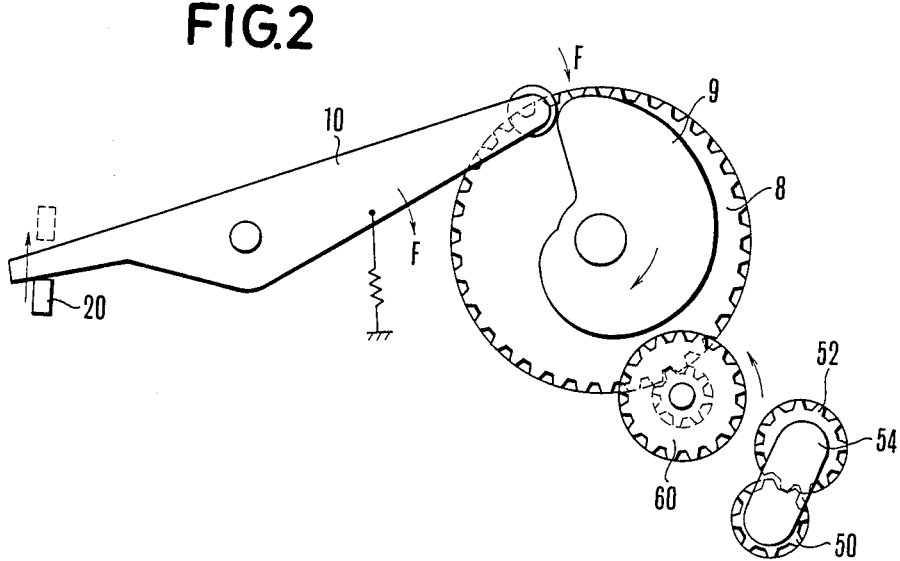
Figure 3:
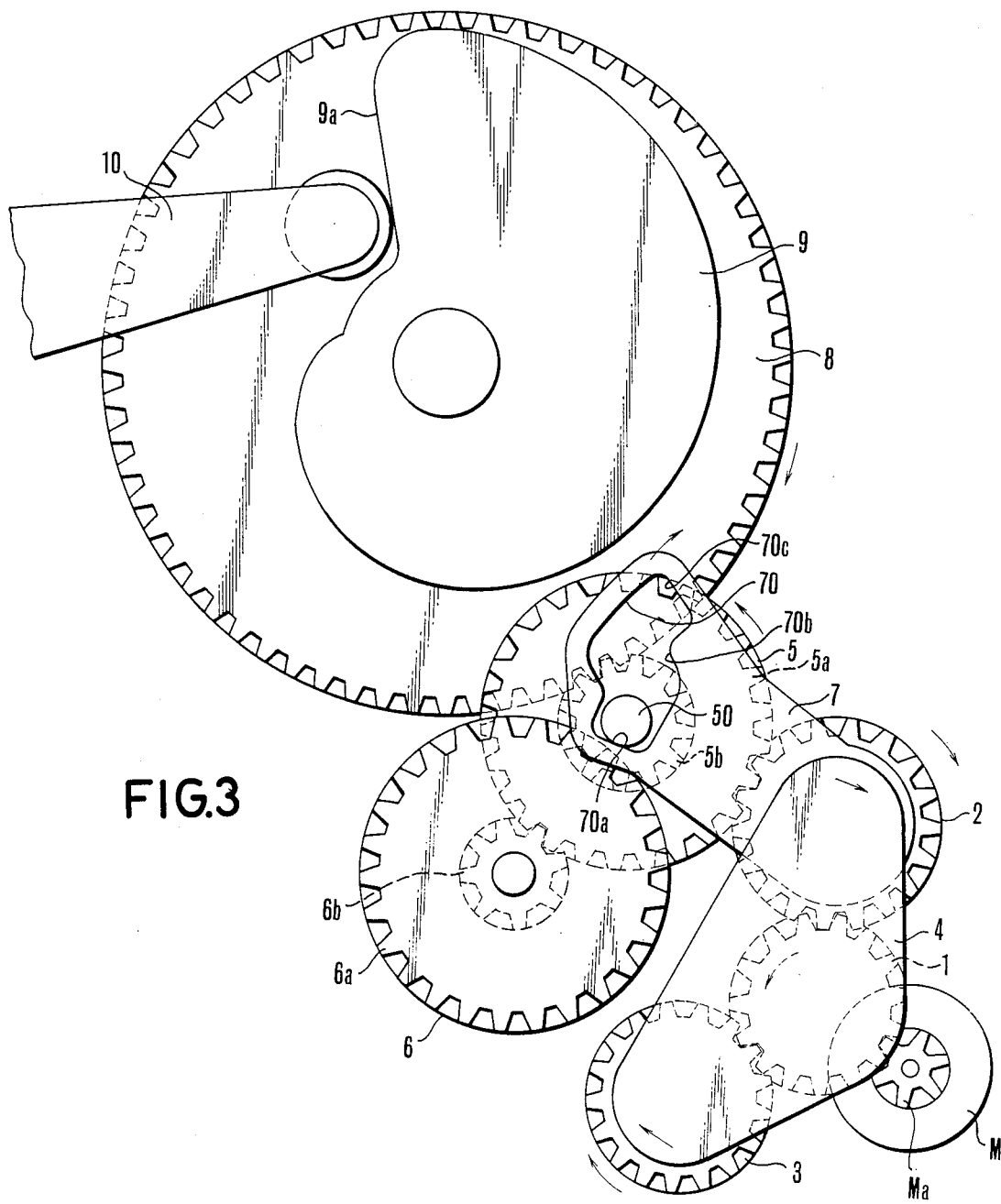
FIGS. 3 and 4 are elevational views of an embodiment of the transmission changeover mechanism according to the invention in two operative positions.
Figure 4:
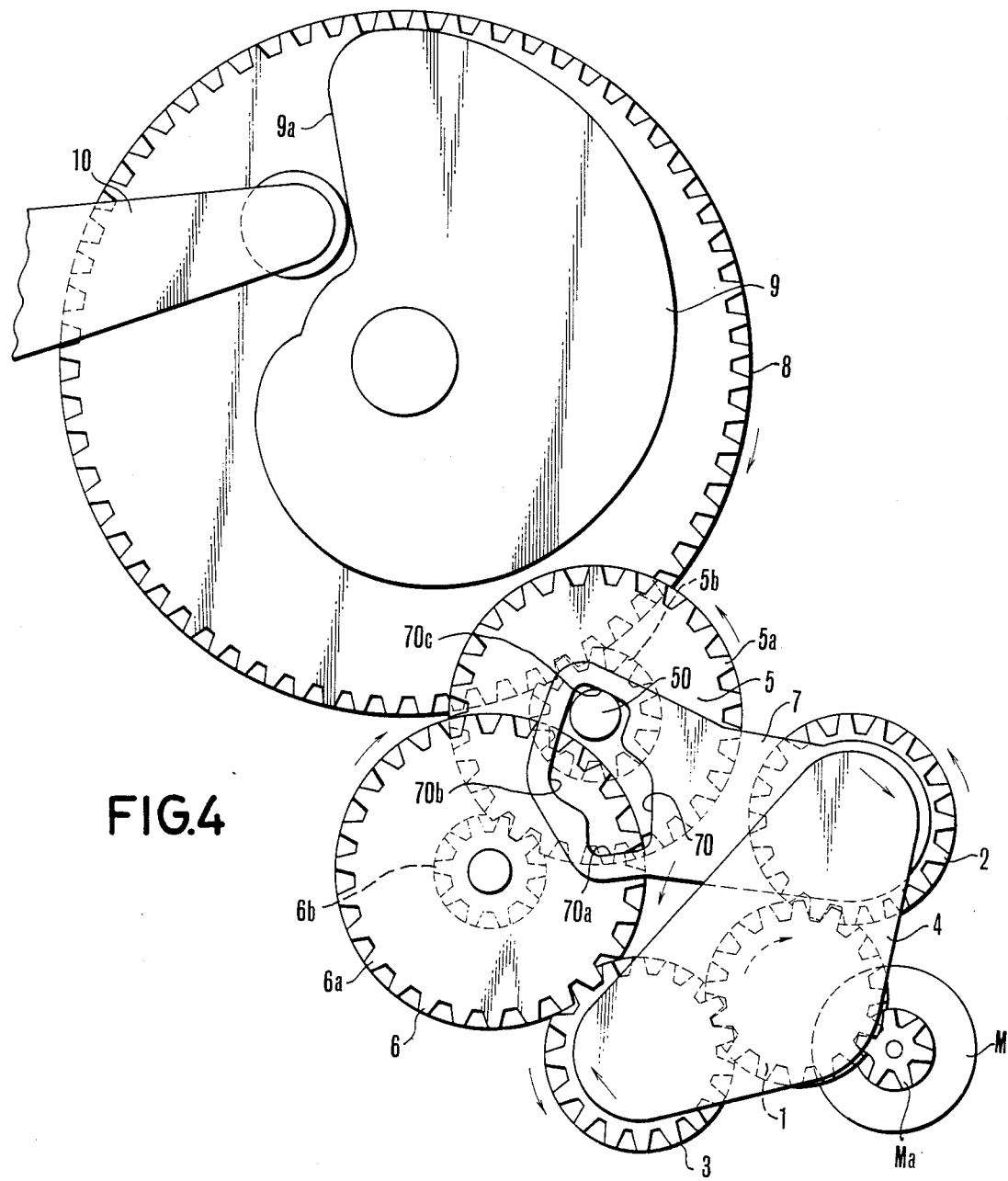

The present invention is next described in connection with an embodiment thereof by reference to FIGS. 3 and 4 where the said reference characters have been employed to denote the similar parts to those of the aforesaid conventional one.

A sun gear 1 is in mesh with a pinion Ma fixedly mounted to the output shaft of a reversible motor M so that it rotates clockwise or counterclockwise depending on the direction of rotation of the motor M. Two planetary gears 2 and 3 are always meshing with the sun gear 1 and rotatably mounted on a carrier or lever 4 so that they can revolve round the sun gear 1. Two 2-stage gears 5 and 6 constitute a speed reduction, where a small gear 6b is in mesh with a large gear 5a. The planetary gears 2 and 3 are arranged to be selectively engageable with large gears 5a and 6a respectively. A planetary changeover limiting member 7 is pivotally mounted on a common shaft of the planetary gear 2, and frictionally connected to the planetary gear 2 by means (not shown) known in the art, for example, a coil spring so that the rotative force of the planetary gear 2 is transmitted thereto by the friction means. In the other portion of the planetary changeover limiting member 7 is a key-shaped cutout 70 into which a shaft 50 of the 2-stage gear 5 extends. A spur gear 8 rotates in mesh with the small gear 5b of the 2-stage gear 5. A charge cam 9 is formed in unison with the spur gear 8 by molding means. By one revolution of the spur gear 8 in a clockwise direction, the power storing lever 10 is turned first in a counterclockwise direction and then in a clockwise direction, whereby an operating mechanism (not shown) of the camera is charged.

When the sun gear 1 rotates in the counterclockwise direction, the planetary carrier lever 4 and the planetary gears 2 and 3 revolve round the sun gear 1 in the counterclockwise direction, whereby the planetary gear 2 is brought into engagement with the large gear 5a of the 2-stage gear 5. Therefore, the spur gear 8 rotates in the clockwise direction with power through a transmission system: the sun gear 1→ the planetary gear 2→ the 2-stage gear 5→ the spur gear 8. FIG. 3 illustrates the initial state of rotation. After the spur gear 8 has rotated from this state to a state where the cam follower on the free end of the power storing lever 10 reaches the terminal end 9a of lift of the charge cam 9, the charge cam 9 is backed up by the charge load of the lever 10. Therefore, the direction of transmission of the force is reversed so that the planetary gear 2 tends to move away from the 2-stage gear 5. Since, at this time, the planetary gear 2 rotates in the clockwise direction, the planetary changeover limiting member 7 is turned in the clockwise direction by the frictional force until an engaging edge of the keyhole 70 abuts on the shaft 50. Here, the planetary gear 2 would otherwise move away but is inhibited from doing it because the engaging edge 70a abuts on the shaft 50. Therefore, despite the fact that a succeeding force is generated on the planetary gear 2, the planetary gear 2 does not move away so far as the direction of rotation of the planetary gear 2 remains the same (the corresponding direction to the clockwise rotation of the charge cam 9). The maintenance of the meshing engagement with the 2-stage gear 5 enables the rotation control of the charge cam 9 by the motor M to be performed until the last.

Next, when the sun gear 1 rotates in the reversed or clockwise direction to that described above, the direction of rotation of the planetary gears 2 and 3 becomes counterclockwise and the planetary changeover limiting member 7 also is given counterclockwise rotation. Since, in this state, the planetary changeover limiting member 7 can rotate in the counterclockwise direction, it starts to rotate in the counterclockwise direction. When the planetary changeover limiting member 7 has somewhat rotated, the engaging edge 70a no longer abuts on the shaft 50. As a large-width portion 70b comes in, the planetary gear 2 is taken out of engagement with the 2-stage gear 5 by the rotative force of the planetary carrier lever 4. The planetary carrier lever 4 further turns until the planetary gear 3 enages with the large gear 6a of the 2-stage gear 6. This state is shown in FIG. 4, where a transmission system: the sun gear 1→ the planetary gear 3→ the 2-stage gear 6→ the 2-stage gear 5→ the spur gear 8 is formed. Because the force is transmitted to the charge cam 9 through the 2-stage gears 6 and 5 from the planetary gear 3, the speed reduction ratio is increased from that of the transmission system of FIG. 3. It should be noted that, although the directions of rotation of the sun gear 1 in the positions of FIGS. 3 and 4 are opposite to each other, their numbers of teeth mesh until the spur gear 8 differ from each of one, so that the direction of rotation of the spur gear 8 remains the same. Even when the charge cam 9 is backed up by the power storing lever 10, in a similar manner to that described in connection with FIG. 3, but for now another engaging edge 70c is brought into abutting engagement on the shaft 50, whereby the planetary gear 3 is prevented from moving away. Also when the planetary gears 2 and 3 are changed over by rotating the sun gear 1 in the counterclockwise direction, the operation is performed in a similar manner to that described above.

What is characteristic of the embodiment described above is that when the planetary gear 2, 3 is meshing with the 2-stage gear 5 or 6 as the transmission wheel by the rotation in the meshing direction, the movement of the planetary gear 2, 3 to the anti-meshing direction can be prevented by the engaging edge 7a or 7c of the planetary changeover limiting member 7. Therefore, even if, as the terminal end 9a of lift of the charge cam 9 reaches the power storing lever 10, a working force of anti-meshing direction is applied to the planetary gear 2, 3 the said gear 2, 3 continues meshing. Thus the meshing engagement is reliably maintained until the last stage. Even at the last stage where the rotation of said gear 2, 3 stops (the rotation of the sun gear 1 stops), the meshing engagement remains effective. Hence, it is possible to prevent incorrect or excessive rotation of the charge cam.

It should be noted that, in the embodiment described above, as the operating mechanism of the camera to which the driving torque is transmitted through the planetary clutch, mention has been made of the charge mechanism for the shutter and the mirror. Yet, another embodiment of the invention may be applied to a film winding mechanism or film rewinding mechanism, where a similar advantage to that of the foregoing embodiment is produced, provided that the speed of rotation of the transmission wheel becomes eventually faster than that of rotation of the drive wheel or the planetary gear.

Also that the planetary gear 2, 3 in the stopped state continues to be in mesh with the 2-stage gear 5, 6 as the transmission wheel by the planetary changeover limiting member 7 is very advantageous in the sense that a faulty operation of the camera is prevented.

As has been described above, according to the invention, in the camera in which the operating mechanism is driven through the planetary clutch, the disengagement of the planetary gear from the transmission wheel by the reaction force is prevented by using the planetary changeover limiting member. Therefore, the invention can provide a transmission changeover mechanism for the camera which enables the operating mechanism of the camera to be driven with high reliablity and accuracy.

What is claimed is:

1. A transmission changeover mechanism for a camera comprising:
  (a) a transmission system for transmitting rotation of a motion generating wheel to a transmision gear of an operating mechanism of the camera;
  (b) a planetary clutch arranged in said transmission system, said planetary clutch comprising a sun gear and at least one planetary gear, said sun gear meshing with a gear on the motion generating wheel side, and said planetary gear being changeable between a meshing and non-meshing engagement with said transmission gear; and (c) a limiting member for limiting the revolving movement of said planetary gear of said planetary clutch, said limiting member inhibiting the revolving movement of said planetary gear in the meshing release direction in response to the meshing position of said planetary gear in the rotation in the meshing direction with said transmission gear, and said limiting member releasing the inhibition of said revolving movement in response to the rotation of said planetary gear in the non-meshing direction, wherein said operating mechanism of the camera causes by way of operation production of an event wherein the transmission of force is directed in the following sequence: said transmission gear→ said planetary gear→ said sun gear, and wherein said operating mechanism of the camera includes a cam which rotates as said transmission gear rotates, and a lever whose swinging is controlled by said cam, a cam displacement of said cam being set such that the transmission of force is transmitted in the following sequence: said transmission gear→ said planetary gear→ said sun gear occurs on the way of operation.

2. A transmission changeover mechanism for a camera comprising:

(a) a transmission system for transmitting rotation of a motion generating wheel to a transmission gear of an operating mechanism of the camera;

(b) a planetary clutch arranged in said transmission system, said planetary clutch comprising a sun gear and at least one planetary gear, said sun gear meshing with a gear on a motion generating wheel side, and said planetary gear being changeable between a meshing and non-meshing engagement with said transmission gear; and (c) a limiting member for limiting the revolving movement of said planetary gear of said planetary clutch, said limiting member being rotatably mounted on the common shaft of said planetary gear, being frictionally connected thereto, and having formed therein an engagement portion such that in the meshing position of said planetary gear in the rotation of the meshing direction with said transmission gear, it is positioned in a movement hindering position of the meshing release direction of said planetary gear, whereas, in the rotation of the non-meshing direction of said planetary gear, it is swung by said friction to retract from said movement hindering position.

3. A camera according to claim 2, wherein said operating mechanism of the camera causes by way of operation production of an event wherein the transmission of force is directed in the following sequence: said transmission gear→ said planetary gear→ said sun gear.

* * * * *

UNITED STATES PATENT AND TRADEMARK OFFICE
CERTIFICATE OF CORRECTION

PATENT NO. : 4,766,452

DATED : August 23, 1988

INVENTOR(S) : Tsunemasa Ohara et al.

It is certified that error appears in the above-identified patent and that said Letters Patent is hereby corrected as shown below:

Title page:

Please insert in the correct position the following:

-- [30] Foreign Application Priority Data

July 24, 1985 (Japan)..............60-163616 --.

Signed and Sealed this

Twenty-first Day of March, 1989

Attest:

DONALD J. QUIGG

Attesting Officer

Commissioner of Patents and Trademarks